United States Patent
Tang

(10) Patent No.: US 10,638,329 B2
(45) Date of Patent: Apr. 28, 2020

(54) METHOD FOR IMPLEMENTING ANTENNA CLOUD NODE COMMUNICATION IN INDOOR HIGH-DENSITY NETWORK AND SYSTEM THEREOF

(71) Applicant: HuiZhou TCL Mobile Communication Co., Ltd., HuiZhou (CN)

(72) Inventor: Yanbo Tang, HuiZhou (CN)

(73) Assignee: HuiZhou TCL Mobile Communication Co., Ltd., HuiZhou (CN)

( * ) Notice: Subject to any disclaimer, the term of this patent is extended or adjusted under 35 U.S.C. 154(b) by 114 days.

(21) Appl. No.: 15/541,485

(22) PCT Filed: Dec. 2, 2016

(86) PCT No.: PCT/CN2016/108384
§ 371 (c)(1),
(2) Date: Jul. 5, 2017

(87) PCT Pub. No.: WO2017/190501
PCT Pub. Date: Nov. 9, 2017

(65) Prior Publication Data
US 2018/0213410 A1 Jul. 26, 2018

(30) Foreign Application Priority Data

May 6, 2016 (CN) .......................... 2016 1 0295688

(51) Int. Cl.
*H04W 24/02* (2009.01)
*H04W 16/20* (2009.01)
(Continued)

(52) U.S. Cl.
CPC ............. *H04W 16/20* (2013.01); *H04L 67/10* (2013.01); *H04W 16/28* (2013.01); *H04W 24/02* (2013.01);
(Continued)

(58) Field of Classification Search
CPC ..... H04W 84/22; H04W 16/20; H04W 24/02; H04W 88/085; H04W 16/28;
(Continued)

(56) References Cited

U.S. PATENT DOCUMENTS 6,463,290 B1 * 10/2002 Stilp ........................ G01S 5/02
455/456.1
8,085,782 B2 12/2011 Fahldieck
(Continued)

FOREIGN PATENT DOCUMENTS

| CN | 101431470 | 5/2009 |
| CN | 103384388 | 11/2013 |

(Continued)

*Primary Examiner* — Un C Cho
*Assistant Examiner* — Kenan Cehic

(57) ABSTRACT

A method for implementing an antenna cloud node communication in an indoor high-density network and system thereof are described. When a plurality of mRRHs detect uplink signals of the user equipments and a signal-to-interference noise ratio of each uplink signal is greater than or equal to a signal-to-interference noise ratio threshold, the mRRH coverage area information corresponding to the position of the user equipment is acquired according to the numbers of the mRRHs. The mRRH coverage area information corresponding to the position of the user equipment is configured to establish an antenna cloud node cluster, represented by a matrix, and the user equipments make communication each other by using the antenna cloud node cluster.

19 Claims, 6 Drawing Sheets

(51) Int. Cl.
    *H04L 29/08*    (2006.01)
    *H04W 16/28*   (2009.01)
    *H04W 72/04*   (2009.01)
    *H04W 72/08*   (2009.01)
    *H04W 88/08*   (2009.01)

(52) U.S. Cl.
    CPC ..... *H04W 72/0413* (2013.01); *H04W 72/082* (2013.01); *H04W 88/085* (2013.01); *Y02D 70/00* (2018.01); *Y02D 70/26* (2018.01)

(58) Field of Classification Search
    CPC .. H04W 72/0413; H04W 72/082; H04B 7/02; H04B 7/0022; H04B 7/024; H04B 7/04; H04B 7/14; H04B 7/15; H04L 67/10; Y02D 70/26; Y02D 70/00
    See application file for complete search history.

(56) References Cited

U.S. PATENT DOCUMENTS

| | | | |
|---|---|---|---|
| 9,160,497 | B2 | 10/2015 | Elliott |
| 10,536,939 | B2 | 1/2020 | Chang et al. |
| 2002/0097480 | A1* | 7/2002 | Dominic ............... H01S 3/302 359/333 |
| 2006/0240814 | A1* | 10/2006 | Cutler ................ H04W 16/18 455/423 |
| 2009/0036155 | A1* | 2/2009 | Wu .................... H04W 52/286 455/522 |
| 2009/0082031 | A1* | 3/2009 | Kim ................. H04W 72/1263 455/452.2 |
| 2009/0285158 | A1* | 11/2009 | Rezaiifar ........... H04W 52/241 370/328 |
| 2010/0271985 | A1* | 10/2010 | Gabriel ................ H01Q 1/246 370/278 |
| 2011/0279310 | A1* | 11/2011 | Shibohta ............... G01S 19/36 342/357.25 |
| 2012/0281640 | A1 | 11/2012 | Xu et al. |
| 2012/0282936 | A1 | 11/2012 | Gao et al. |
| 2013/0294418 | A1* | 11/2013 | Vukovic ............. H04J 11/0063 370/336 |
| 2013/0322375 | A1 | 12/2013 | Chang et al. |
| 2014/0119312 | A1* | 5/2014 | Doetsch ................ H04B 7/024 370/329 |
| 2014/0133333 | A1* | 5/2014 | Liu ....................... H04W 24/10 370/252 |
| 2014/0269338 | A1* | 9/2014 | Jung ..................... H04L 5/0055 370/241 |
| 2014/0328327 | A1* | 11/2014 | Xiao .................... H04W 36/30 370/332 |
| 2014/0348142 | A1* | 11/2014 | Seo ....................... H04L 5/0092 370/336 |
| 2015/0092651 | A1* | 4/2015 | Chow ................... H04W 76/10 370/312 |
| 2015/0189533 | A1* | 7/2015 | Fehske ................ H04W 16/18 370/229 |
| 2015/0195717 | A1 | 7/2015 | Jain |
| 2015/0215880 | A1* | 7/2015 | Rafique ................ H04J 3/0608 370/337 |
| 2015/0326290 | A1* | 11/2015 | Harrison .............. H04B 7/0456 375/260 |
| 2015/0365152 | A1* | 12/2015 | Frenne ................ H04B 7/0626 370/252 |
| 2016/0330676 | A1* | 11/2016 | Thangarasa .......... H04W 76/14 |
| 2017/0063503 | A1* | 3/2017 | Liu ...................... H04L 5/0044 |
| 2017/0272118 | A1* | 9/2017 | Lingam ................ H04B 1/7097 |
| 2018/0007562 | A1* | 1/2018 | Auer .................... H04W 16/32 |
| 2018/0035350 | A1* | 2/2018 | Rahman .............. H04W 64/00 |
| 2018/0198567 | A1* | 7/2018 | Huss ................... H04L 1/1829 |

FOREIGN PATENT DOCUMENTS

| | | |
|---|---|---|
| CN | 103493390 | 1/2014 |
| CN | 104335518 | 2/2015 |
| CN | 105472721 | 4/2016 |
| CN | 106028362 | 10/2016 |
| EP | 2785127 | 10/2014 |

* cited by examiner

METHOD FOR IMPLEMENTING ANTENNA CLOUD NODE COMMUNICATION IN INDOOR HIGH-DENSITY NETWORK AND SYSTEM THEREOF

RELATED APPLICATIONS

This application is a National Phase of PCT Patent Application No. PCT/CN2016/108384 having International filing date of Dec. 2, 2016, which claims the benefit of priority of Chinese Patent Application No. 201610295688.X filed on May 6, 2016. The contents of the above applications are all incorporated by reference as if fully set forth herein in their entirety.

FIELD AND BACKGROUND OF THE INVENTION

The present invention relates to a technical field of mobile communications, and more particularly to a method for implementing an antenna cloud node communication in an indoor high-density network and system thereof.

With the increment of an indoor communication, an indoor coverage of a wireless network is increasingly important. Currently, an intelligent digitalized indoor system mainly includes a building baseband unit (BBU), a wireless hub, and a micro power remote radio head (abbreviated as the mRRH, indicating a low power wireless broadband head-end apparatus). If all the MRRHs in a building according to user requirements form a cellular unit, but it is required to divide the cellular unit from one into two sub-units according to different requirements, or to divide the cellular unit into more sub-units. The wireless hub is a path planning center in an indoor intelligent digital system. The wireless signals from each mRRH are synthesized into an uplink signal in the wireless hub, and a downlink signal from BBU is distributed to the MRRHs respectively.

As the explosive growth of data and flow transmission, more and more antennas are deployed in the indoor system. This type of the network can be a high-density and low-power wireless access point network (i.e., a high density small cell network). Since so many nodes form region boundaries in per unit area, the boundaries in BS-center architecture result in the following problems: (1) a high-frequency switching; and (2) more and more interference.

Consequently, there is a need to be improved and developed.

SUMMARY OF THE INVENTION

Based on the above-mentioned drawbacks, one objective of the present invention is to provide a method for implementing an antenna cloud node communication in an indoor high-density network and system thereof to solve the problems of the high-density low-power wireless access points (i.e., a high density small cell network) where more and more antennas are deployed in the network. So much of the antenna nodes cause the problem of the increased boundary per unit area.

For the above-mentioned objective, the present invention employs the following technical schemes.

In one embodiment, the present invention provides a method for implementing an antenna cloud node communication in an indoor high-density network, comprising the steps of:

transmitting, by a user equipment, an uplink signal to allow a plurality of micro power remote radio heads (mRRHs) to detect the uplink signal of the user equipment;

acquiring, by a baseband processing unit, a mRRH coverage area information corresponding to a position of the user equipment according to a plurality of the numbers of the mRRHs when each mRRH identifies the uplink signal of the user equipment and a signal-to-interference noise ratio of each uplink signal is either greater than or equal to a signal-to-interference noise ratio threshold;

establishing an antenna cloud node cluster, represented by a matrix, according to the mRRH coverage area information corresponding to the position of the user equipment, and making, by the user equipment, communication using the antenna cloud node cluster; and continuously detecting, by each mRRH, the uplink signal of the user equipment, when a movement of the user equipment is identified and the signal-to-interference noise ratio corresponding to the detected uplink signal of one mRRH in the antenna cloud node cluster is less than the signal-to-interference noise ratio threshold.

In the method for implementing the antenna cloud node communication in the indoor high-density network, the step of acquiring, by the baseband processing unit, the mRRH coverage area information corresponding to the position of the user equipment according to the numbers of the mRRHs when each mRRH identifies the uplink signal of the user equipment and the signal-to-interference noise ratio of each uplink signal is either greater than or equal to the signal-to-interference noise ratio threshold further comprises:

detecting, by the mRRHs, the uplink signal in real-time, wherein when the mRRHs identify the uplink signal of the user equipment, each mRRH correspondingly sends an in-phase and quadrature signal to the baseband processing unit;

acquiring, by the baseband processing unit; the in-phase and quadrature signal of which the signal-to-interference noise ratio is greater than the signal-to-interference noise ratio threshold, based on each in-phase and quadrature signal of each mRRH; and acquiring the mRRH coverage area information according to the numbers of the mRRHs corresponding to the in-phase and quadrature signals which comprises the signal-to-interference noise ratio greater than or equal to the signal-to-interference noise ratio threshold.

In the method for implementing the antenna cloud node communication in the indoor high-density network, during the step of acquiring the mRRH coverage area information according to the numbers of the mRRHs corresponding to the in-phase and quadrature signals which comprises the signal-to-interference noise ratio greater than or equal to the signal-to-interference noise ratio threshold, one mRRH having a maximum signal-to-interference noise ratio is defined as a master node, and the remaining mRRHs are defined as slave nodes.

In the method for implementing the antenna cloud node communication in the indoor high-density network, the step of establishing an antenna cloud node cluster, represented by a matrix, according to the mRRH coverage area information corresponding to the position of the user equipment, and making, by the user equipment, communication using the antenna cloud node cluster further comprises:

generating the mRRH coverage area information according to the position of the user equipment, wherein the mRRH coverage area information is composed of the numbers of the mRRHs;

establishing the antenna cloud node cluster, represented by the matrix, by assigning the numbers of the mRRHs as nodes; and making, by the user equipment, communication using the antenna cloud node cluster.

In the method for implementing the antenna cloud node communication in the indoor high-density network, the step of establishing the antenna cloud node cluster, represented by the matrix, by assigning the numbers of the mRRHs as nodes further comprises:

assigning the numbers of the mRRHs as the nodes wherein a portion of nodes corresponding to the signal-to-interference noise ratio of the uplink signal which is greater than or equal to the signal-to-interference noise ratio threshold are quantized to 1, and another portion of nodes corresponding to the signal-to-interference noise ratio of the uplink signal which is less than to the signal-to-interference noise ratio threshold are quantized to 0, for generating the matrix of the antenna cloud node cluster.

In the method for implementing the antenna cloud node communication in the indoor high-density network, the step of continuously detecting, by each mRRH, the uplink signal of the user equipment, when the movement of the user equipment is identified and the signal-to-interference noise ratio corresponding to the detected uplink signal of one mRRH in the antenna cloud node cluster is less than the signal-to-interference noise ratio threshold further comprises:

detecting the movement of the user equipment;

when the movement of the user equipment is identified, determining whether the signal-to-interference noise ratio corresponding to the uplink signal of the mRRH is less than the signal-to-interference noise ratio threshold in the antenna cloud node cluster or not; and continuously detecting, by each mRRH, the uplink signal of the user equipment for updating the matrix corresponding to the antenna cloud node cluster if the signal-to-interference noise ratio corresponding to the uplink signal of the mRRH is less than the signal-to-interference noise ratio threshold in the antenna cloud node cluster.

In one embodiment, the present invention provides a method for implementing an antenna cloud node communication in an indoor high-density network, comprising the steps of:

(A) acquiring, by a baseband processing unit, a mRRH coverage area information corresponding to a position of the user equipment according to a plurality of the numbers of the mRRHs when each mRRH identifies the uplink signal of the user equipment and a signal-to-interference noise ratio of each uplink signal is either greater than or equal to a signal-to-interference noise ratio threshold; and (B) establishing an antenna cloud node cluster, represented by a matrix, according to the mRRH coverage area information corresponding to the position of the user equipment, and making, by the user equipment, communication using the antenna cloud node cluster.

In the method for implementing the antenna cloud node communication in the indoor high-density network, the step (A) further comprises:

(A1) transmitting, by a user equipment, an uplink signal;

(A2) detecting, by the mRRHs, the uplink signal in real-time, wherein when the mRRHs identify the uplink signal of the user equipment, each mRRH correspondingly, sends an in-phase and quadrature signal to the baseband processing unit;

(A3) acquiring, by the baseband processing unit, the in-phase and quadrature signal, of which the signal-to-interference noise ratio is greater than the signal-to-interference noise ratio threshold, based on each in-phase and quadrature signal of each mRRH; and (A4) acquiring the mRRH coverage area information according to the numbers of the mRRHs corresponding to the in-phase and quadrature signals which comprises the signal-to-interference noise ratio greater than or equal to the signal-to-interference noise ratio threshold.

In the method for implementing the antenna cloud node communication in the indoor high-density network, during the step (A4) of acquiring the mRRH coverage area information according to the numbers of the mRRHs corresponding to the in-phase and quadrature signals which comprises the signal-to-interference noise ratio greater than or equal to the signal-to-interference noise ratio threshold, one mRRH having a maximum signal-to-interference noise ratio is defined as a master node, and the remaining mRRHs are defined as slave nodes.

In the method for implementing the antenna cloud node communication in the indoor high-density network, the step (B) further comprises:

(B1) generating the mRRH coverage area information according to the position of the user equipment, wherein the mRRH coverage area information is composed of the numbers of the mRRHs;

(B2) establishing the antenna cloud node cluster, represented by the matrix by assigning the numbers of the mRRHs as nodes; and (B3) making, by the user equipment, communication using the antenna cloud node cluster.

In the method for implementing the antenna cloud node communication in the indoor high-density network, the step (132) further comprises:

assigning the numbers of the mRRHs as the nodes wherein a portion of nodes corresponding to the signal-to-interference noise ratio of the uplink signal which is greater than or equal to the signal-to-interference noise ratio threshold are quantized to 1, and another portion of nodes corresponding to the signal-to-interference noise ratio of the uplink signal which is less than to the signal-to-interference noise ratio threshold are quantized to 0, for generating the matrix of the antenna cloud node cluster The method for implementing the antenna cloud node communication in the indoor high-density network further comprises:

continuously detecting, by each mRRH, the uplink signal of the user equipment in the step (A), when a movement of the user equipment is identified and the signal-to-interference noise ratio corresponding to the detected uplink signal of one mRRH in the antenna cloud node cluster is less than the signal-to-interference noise ratio threshold.

In the method for implementing the antenna cloud node communication in the indoor high-density network, the step (C) further comprises:

(C1) detecting the movement of the user equipment;

(C2) when the movement of the user equipment is identified, determining whether the signal-to-interference noise ratio corresponding to the uplink signal of the mRRH is less than the signal-to-interference noise ratio threshold in the antenna cloud node cluster or not; and (C3) continuously detecting, by each mRRH, the uplink signal of the user equipment in the step (A) for updating the matrix corresponding to the antenna cloud node cluster if the signal-to-interference noise ratio corresponding to the uplink signal of the mRRH is less than the signal-to-interference noise ratio threshold in the antenna cloud node cluster.

In one embodiment, the present invention provides a system for implementing an antenna cloud node communication in an indoor high-density network, comprising:

a coverage area information acquiring module, for acquiring, by a baseband processing unit, a mRRH coverage area information corresponding to a position of the user equipment according to a plurality of the numbers of the mRRHs when each mRRH identifies the uplink signal of the user equipment and a signal-to-interference noise ratio of each uplink signal is either greater than or equal to a signal-to-interference noise ratio threshold; and an antenna cloud node cluster establishing module, for establishing an antenna cloud node cluster, represented by a matrix, according to the mRRH coverage area information corresponding to the position of the user equipment, and making, by the user equipment, communication using the antenna cloud node cluster.

In the system for implementing the antenna cloud node communication in the indoor high-density network, the overage area information acquiring module further comprises:

an uplink signal transmitting unit disposed in the user equipment, configured to transmit, by a user equipment, an uplink signal.

In the system for implementing the antenna cloud node communication in the indoor high-density network, the overage area information acquiring module further comprises:

an in-phase and quadrature signal transmitting unit configured to detect, by the mRRHs, the uplink signal in real-time, wherein when the mRRHs identify the uplink signal of the user equipment, each mRRH correspondingly sends an in-phase and quadrature signal to the baseband processing unit;

a comparing unit configured to acquire, by the baseband processing unit, the in-phase and quadrature signal, of which the signal-to-interference noise ratio is greater than the signal-to-interference noise ratio threshold, based on each in-phase and quadrature signal of each mRRH; and an information acquiring unit configured to acquire the mRRH coverage area information according to the numbers of the mRRHs corresponding to the in-phase and quadrature signals which comprises the signal-to-interference noise ratio greater than or equal to the signal-to-interference noise ratio threshold.

In the system for implementing the antenna cloud node communication in the indoor high-density network, when the mRRH coverage area information is acquired according to the numbers of the mRRHs corresponding to the in-phase and quadrature signals which comprises the signal-to-interference noise ratio greater than or equal to the signal-to-interference noise ratio threshold, one mRRH having a maximum signal-to-interference noise ratio is defined as a master node, and the remaining mRRHs are defined as slave nodes.

The system for implementing the antenna cloud node communication in the indoor high-density network further comprises:

an update unit configured to enable the coverage area information acquiring module when a movement of the user equipment is identified and the signal-to-interference noise ratio corresponding to the detected uplink signal of one mRRH in the antenna cloud node cluster is less than the signal-to-interference noise ratio threshold.

In the system for implementing the antenna cloud node communication in the indoor high-density network, the step (B) further comprises:

an information generating unit configured to generate the mRRH coverage area information according to the position of the user equipment, wherein the mRRH coverage area information is composed of the numbers of the mRRHs;

a matrix unit configured to establish the antenna cloud node cluster, represented by the matrix, by assigning the numbers of the mRRH as nodes; and a communication unit configured to make communication using the antenna cloud node cluster.

In the system for implementing the antenna cloud node communication in the indoor high-density network, the matrix unit is further configured to assign the numbers of the mRRHs as the nodes wherein a portion of nodes corresponding to the signal-to-interference noise ratio of the uplink signal which is greater than or equal to the signal-to-interference noise ratio threshold are quantized to 1, and another portion of nodes corresponding to the signal-to-interference noise ratio of the uplink signal which is less than to the signal-to-interference noise ratio threshold are quantized to 0, for generating the matrix of the antenna cloud node cluster.

In the method for implementing an antenna cloud node communication in an indoor high-density network and system thereof, the method includes: when a plurality of mRRHs detect uplink signals of the user equipments and a signal-to-interference noise ratio of each uplink signal is greater than or equal to a signal-to-interference noise ratio threshold, a baseband unit obtains mRRH coverage area information corresponding to the position of the user equipment according to the numbers of the mRRHs, where the mRRH indicates a low power wireless broadband head-end apparatus. The mRRH coverage area information corresponding to the position of the user equipment is configured to establish an antenna cloud node cluster, represented by a matrix, and the user equipments make communication each other by using the antenna cloud node cluster. The antenna cloud node clusters are established in real-time based on a user equipment-centric feature to solve the problem of the boundary. The user equipment-centric feature ensures that the signal-to-interference noise ratio in the antenna cloud node cluster is unified, eliminates the high-frequency switching state and provides a continuous network throughput.

DESCRIPTION OF SPECIFIC EMBODIMENTS OF THE INVENTION

The present invention is to provide a method for implementing an antenna cloud node communication in an indoor high-density network and system thereof. The following embodiments refer to the accompanying drawings for exemplifying specific implementable embodiments of the present invention. It should be noted that the exemplary described embodiments are used to describe and understand the present invention, but the present invention is not limited thereto.

Figure 1:
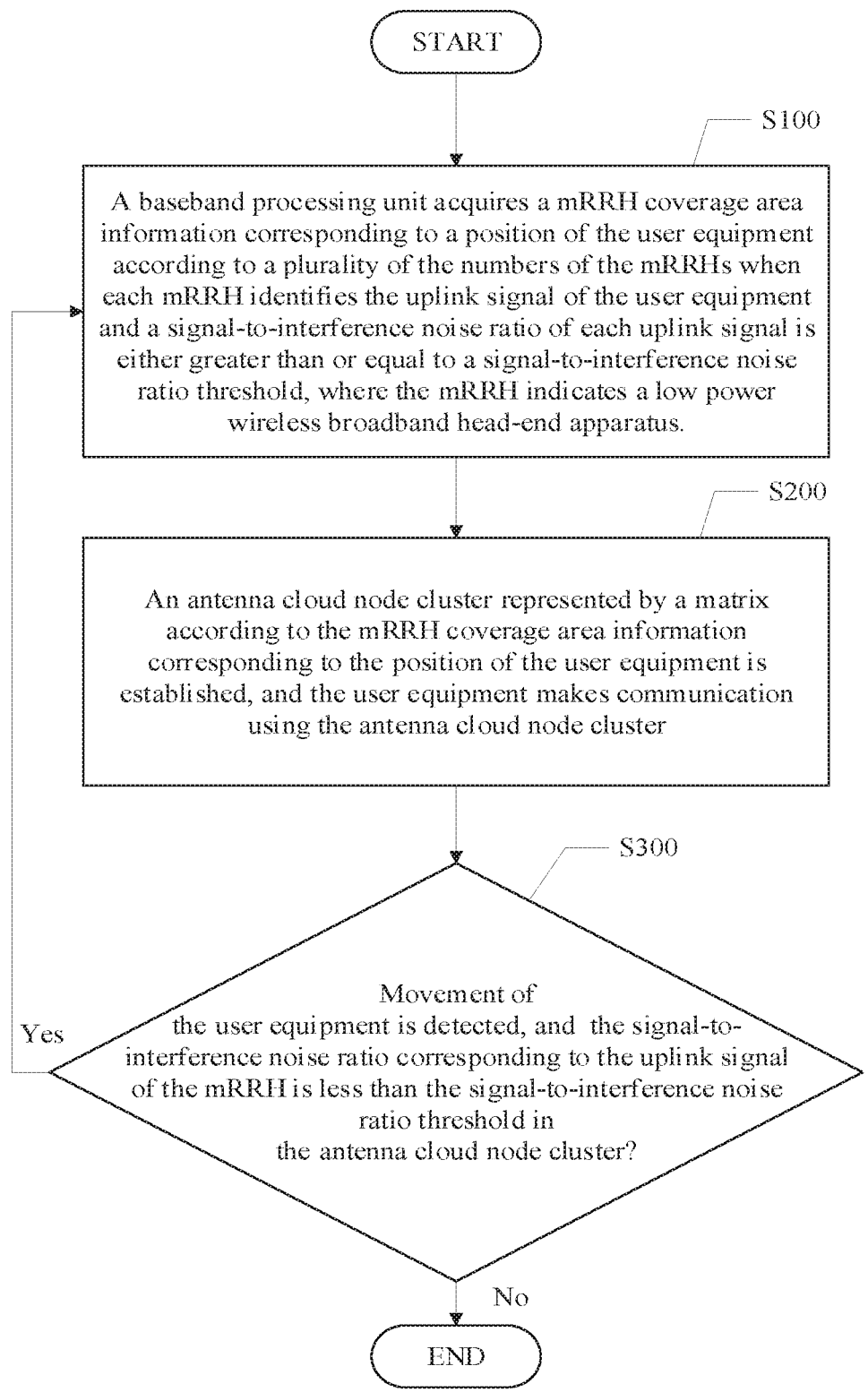
FIG. 1 is a flowchart of a method for implementing an antenna cloud node communication in an indoor high-density network according to one embodiment of the present invention.

FIG. 1 is a flowchart of a method for implementing an antenna cloud node communication in an indoor high-density network according to one embodiment of the present invention. As shown in FIG. 1, the method for implementing an antenna cloud node communication in an indoor high-density network includes the following steps.

In step S100, a baseband processing unit acquires a mRRH coverage area information corresponding to a position of the user equipment according to a plurality of the numbers of the mRRHs when each mRRH identifies the uplink signal of the user equipment and a signal-to-interference noise ratio of each uplink signal is either greater than or equal to a signal-to-interference noise ratio threshold, where the mRRH indicates a low power wireless broadband head-end apparatus.

In one embodiment, when a plurality of mRRHs are located in the indoor space of the buildings and at least one user equipment (e.g., a smart phone, a smart watch or a tablet computer) is disposed in the indoor space, the at least one user equipment transmits an uplink signal so that the mRRHs is able to detect the uplink signal. If the uplink signal detected by the mRRHs includes a signal-to-interference noise ratio of each uplink signal which is greater than or equal to a signal-to-interference noise ratio threshold, a baseband unit obtains the mRRH coverage area information corresponding to the position of the user equipment according to the numbers of the mRRHs.

Figure 2:
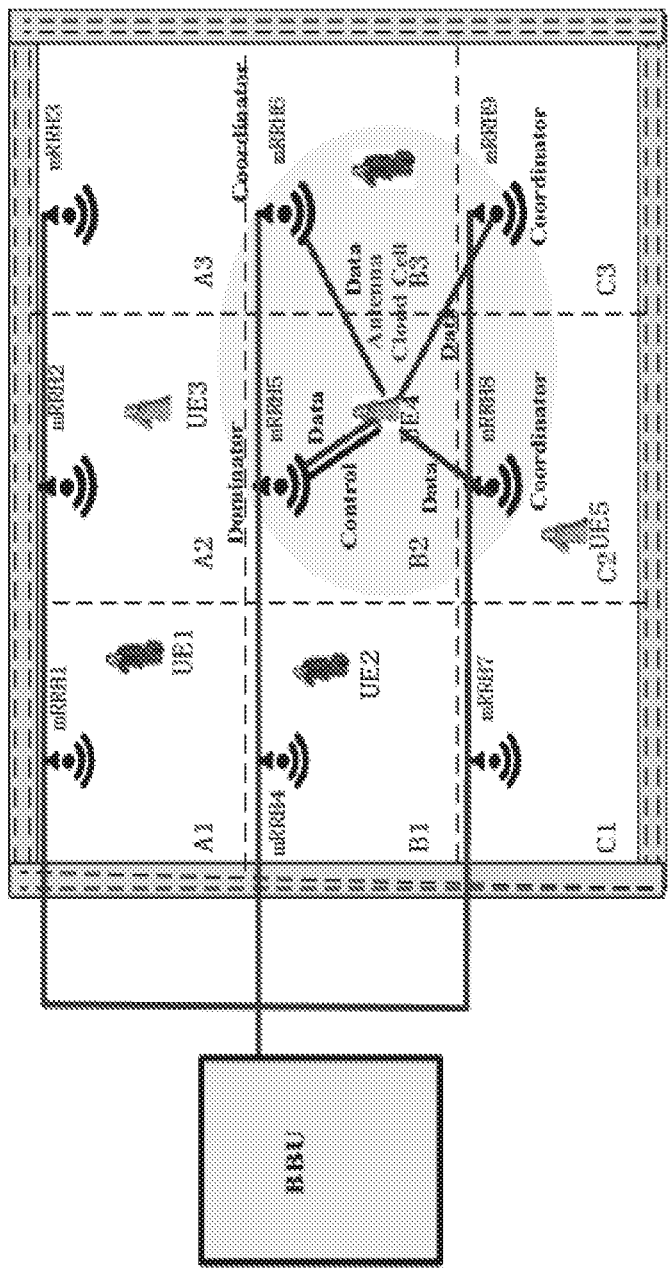
FIG. 2 is a first schematic view of user equipments and mRRH distribution of the method for implementing an antenna cloud node communication in an indoor high-density network according to one embodiment of the present invention.

For example, as shown in FIG. 2, nine mRRHs, sequentially marked as the mRRH 1 to mRRH 9, are located in the indoor space of the buildings and the user equipment 4 (i.e., the UE4) transmits an uplink signal so that the mRRH 5, mRRH 6, mRRH 8, and mRRH 9 are able to detect the uplink signal. If the uplink signal detected by the mRRH 5, mRRH 6, mRRH 8, and mRRH 9 includes a signal-to-interference noise ratio of each uplink signal which is greater than or equal to a signal-to-interference noise ratio threshold, a baseband unit obtains the mRRH coverage area information corresponding to the position of the user equipment 4 according to the numbers of the mRRH 5, mRRH 6, mRRH 8, and mRRH 9, where the mRRH coverage area information may be denoted as (mRRH 5, mRRH 6, mRRH 8, and mRRH 9).

In step S200, an antenna cloud node cluster, represented by a matrix, according to the mRRH coverage area information corresponding to the position of the user equipment is established, and the user equipment makes communication using the antenna cloud node cluster.

In one embodiment, referring to FIG. 2, when the mRRH coverage area information obtained in the step S100 is (mRRH 5, mRRH 6, mRRH 8, and mRRH 9), it indicates that the user equipment is the center of the four nodes including the mRRH 5, the mRRH 6, the mRRH 8, and the mRRH 9, and the antenna cloud node cluster, represented by a matrix, is established according to the four nodes. For the convenience of the communication, one node corresponding to the signal-to-interference noise ratio of the uplink signal which is received by the mRRH 1 to mRRH 9 and is greater than or equal to a signal-to-interference noise ratio threshold is quantized to 1. Another node corresponding to the signal-to-interference noise ratio of the uplink signal which is greater than a signal-to-interference noise ratio threshold is quantized to 0. Thus, the matrix S corresponding to the antenna cloud node cluster may be denoted as follow:

$$S = \begin{array}{c} mRRH \\ UE1 \\ UE2 \\ UE3 \\ UE4 \\ UE5 \end{array} \begin{bmatrix} 1 & 2 & 3 & 4 & 5 & 6 & 7 & 8 & 9 \\ 1 & 1 & 0 & 1 & 1 & 0 & 0 & 0 & 0 \\ 1 & 0 & 0 & 1 & 1 & 0 & 1 & 0 & 0 \\ 1 & 1 & 1 & 1 & 1 & 0 & 0 & 0 & 0 \\ 0 & 0 & 0 & 0 & 1 & 1 & 0 & 1 & 1 \\ 0 & 0 & 0 & 0 & 1 & 0 & 1 & 1 & 1 \end{bmatrix}$$

In this case, the mRRH coverage area information corresponding to UE4 is (mRRH 5, mRRH 6, mRRH 8, and mRRH 9). Furthermore, while determining a master node in the mRRH coverage area information corresponding to each user equipment, one mRRH node having a maximum value of the signal-to-interference noise ratio is regarded as the master node, and the remaining mRRH nodes in the mRRH coverage area information are regarded as slave nodes. As shown in FIG. 2, the mRRH 5 is a master node (i.e., a dominator), and the mRRH 6, mRRH 8 and mRRH 9 are slave nodes (i.e., coordinator), where the mRRH 5 transmits a master control signal to UE4 and meanwhile, the mRRH 6, the mRRH 8 and the mRRH 9 may not be able to send the master control signal to the UE4 so that only one master node is in the each antenna cloud node cluster.

In one embodiment, each mRRH serves as a master node for one of user equipments and as a slave node for another user equipment at the same time. For example, in FIG. 2, the mRRH 5 serves as a master node of the UE4 and s a slave node of the UE 5.

The antenna cloud node clusters are established in real-time based on a user equipment-centric feature to solve the problem of the boundary. The user equipment-centric feature ensures that the signal-to-interference noise ratio in the antenna cloud node cluster is unified, eliminates the high-frequency switching state and provides a continuous network throughput.

Figure 6:
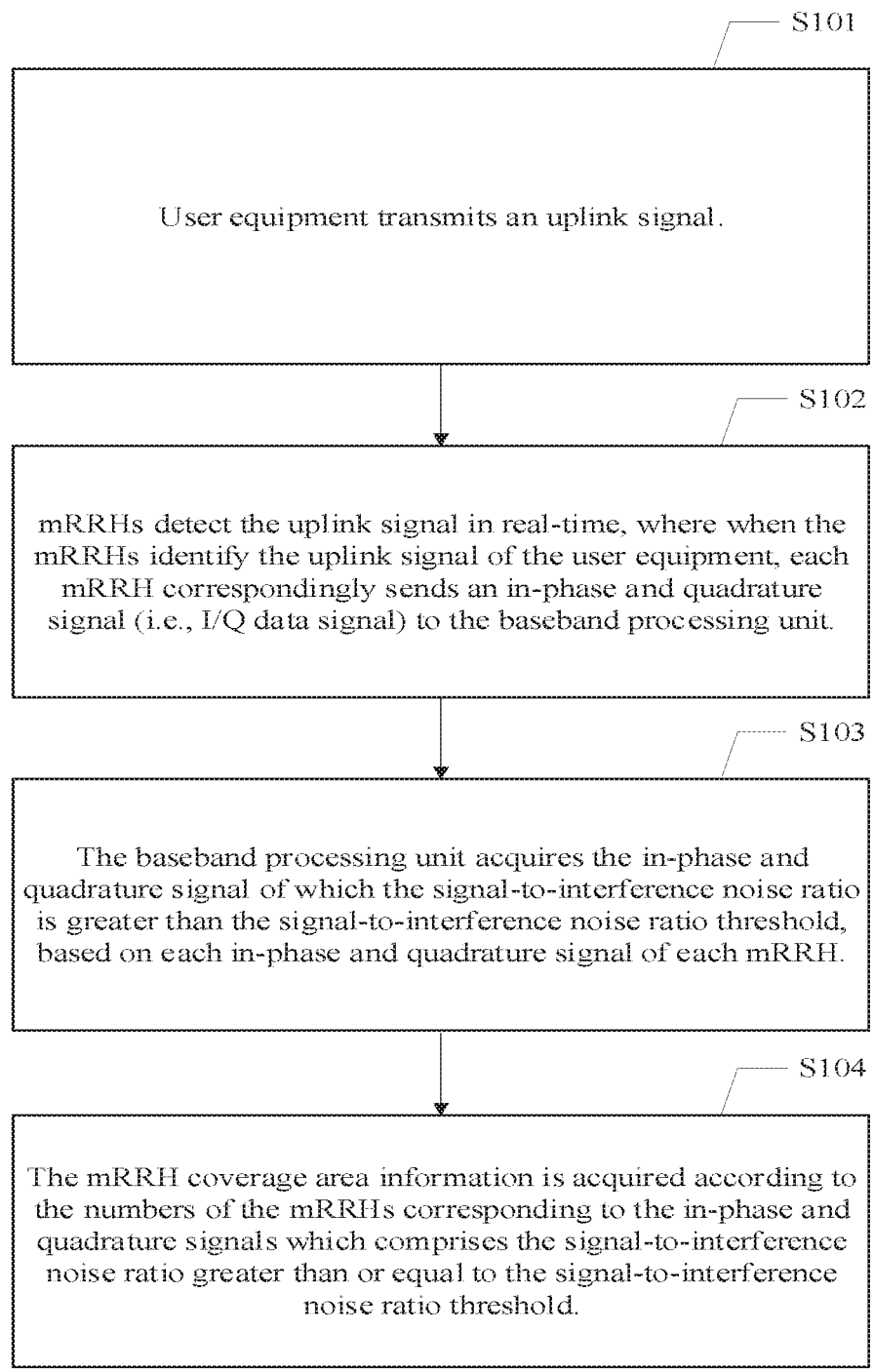

With reference to FIG. 6, the step S100 of the method for implementing an antenna cloud node communication in an indoor high-density network further includes the following steps.

In step S101, the user equipment transmits an uplink signal.

In step S102, the mRRHs detect the uplink signal in real-time, where when the mRRHs identify the uplink signal of the user equipment, each mRRH correspondingly sends an in-phase and quadrature signal (i.e., I/Q data signal) to the baseband processing unit.

In one embodiment, the I/Q data signal is a digital baseband signal transmitted between a wireless broadband head-end apparatus and a base station.

In step S103, the baseband processing unit acquires the in-phase and quadrature signal, of which the signal-to-interference noise ratio is greater than the signal-to-interference noise ratio threshold, based on each in-phase and quadrature signal of each mRRH.

In step S104, the mRRH coverage area information is acquired according to the numbers of the mRRHs corresponding to the in-phase and quadrature signals which comprises the signal-to-interference noise ratio greater than or equal to the signal-to-interference noise ratio threshold.

With reference to FIG. 1, the method for implementing an antenna cloud node communication in an indoor high-density network indoor high-density network further includes the following step.

In step S300, when the movement of the user equipment is detected, and when the signal-to-interference noise ratio corresponding to the uplink signal of the mRRH is less than the signal-to-interference noise ratio threshold in the antenna cloud node cluster, return to the step S100.

Figure 3:
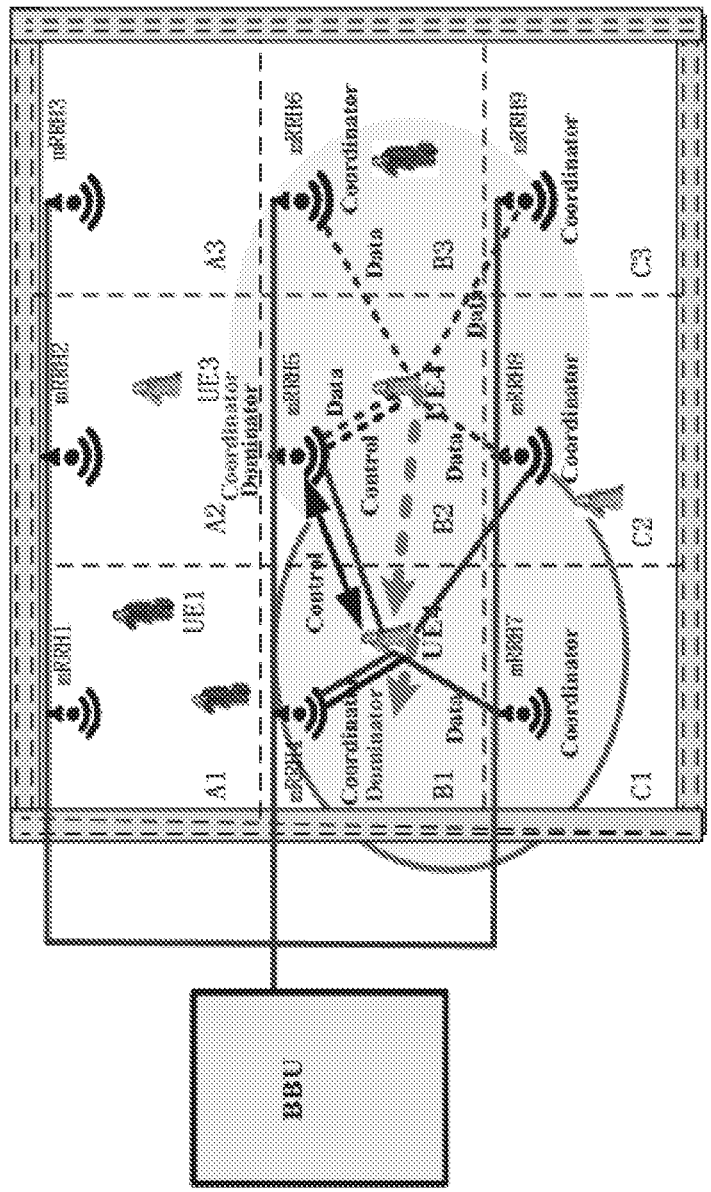
FIG. 3 is a second schematic view of user equipments and mRRH distribution of the method for implementing an antenna cloud node communication in an indoor high-density network according to one embodiment of the present invention.

In one embodiment of FIG. 3, when the user equipment (i.e., UE4) moves from an initial position in FIG. 2 to a predetermined position, the signal-to-interference noise ratio corresponding to the uplink signal of the mRRH 6 and the mRRH 9 is less than the signal-to-interference noise ratio threshold, so that the mRRH 6 and the mRRH 9 are not a portion of the antenna cloud node cluster of the UE4, and return to the step S100. Meanwhile, the mRRH coverage area information corresponding to the UE4 is the mRRH 4, mRRH 5, mRRH7, and mRRH 8. Thus, the matrix S' corresponding to the update antenna cloud node cluster may be denoted as follow:

$$S' = \begin{matrix} mRRH \\ UE1 \\ UE2 \\ UE3 \\ UE4 \\ UE5 \end{matrix} \begin{bmatrix} 1 & 2 & 3 & 4 & 5 & 6 & 7 & 8 & 9 \\ 1 & 1 & 0 & 1 & 1 & 0 & 0 & 0 & 0 \\ 1 & 0 & 0 & 1 & 1 & 0 & 1 & 0 & 0 \\ 1 & 1 & 1 & 1 & 1 & 0 & 0 & 0 & 0 \\ 0 & 0 & 0 & 1 & 1 & 0 & 1 & 1 & 0 \\ 0 & 0 & 0 & 0 & 1 & 0 & 1 & 1 & 1 \end{bmatrix}$$

In one embodiment of FIG. 3, when the user equipment UE4 moves in a predetermined distance, the mRRH 4 is a master node (i.e., a dominator), and the mRRH 5, mRRH 7 and mRRH 8 are slave nodes (i.e., coordinator), where the mRRH 4 transmits a master control signal to UE4 and meanwhile, the mRRH 5, the mRRH 7 and the mRRH 8 may not be able to send the master control signal to the UE4 so that only one master node is in the each antenna cloud node cluster. When each of mRRHs in the antenna cloud node cluster corresponding to one user equipment communicates with the one user equipment, and the signal-to-interference noise ratio of the uplink signal of the one user equipment is greater than or equal to a signal-to-interference noise ratio threshold, it means that the communication quality of user equipment can be ensured.

Figure 4:
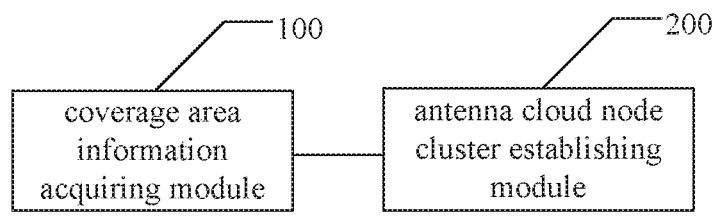
FIG. 4 is a structural block diagram of a system for implementing an antenna cloud node communication in an indoor high-density network according to one embodiment of the present invention.

Based on the above-mentioned embodiments, the present invention further provides a system for implementing an antenna cloud node communication in an indoor high-density network. As shown in FIG. 4, the system for implementing an antenna cloud node communication in an indoor high-density network includes a coverage area information acquiring module 100 and an antenna cloud node cluster establishing module 200.

A coverage area information acquiring module 100 is configured to acquire, by a baseband processing unit, a mRRH coverage area information corresponding to a position of the user equipment according to a plurality of the numbers of the mRRHs when each mRRH identifies the uplink signal of the user equipment and a signal-to-interference noise ratio of each uplink signal is either greater than or equal to a signal-to-interference noise ratio threshold, where the mRRH indicates a low power wireless broadband head-end apparatus.

An antenna cloud node cluster establishing module 200 is configured to establish an antenna cloud node cluster, represented by a matrix, according to the mRRH coverage area information corresponding to the position of the user equipment, and making, by the user equipment, communication using the antenna cloud node cluster.

Figure 5:
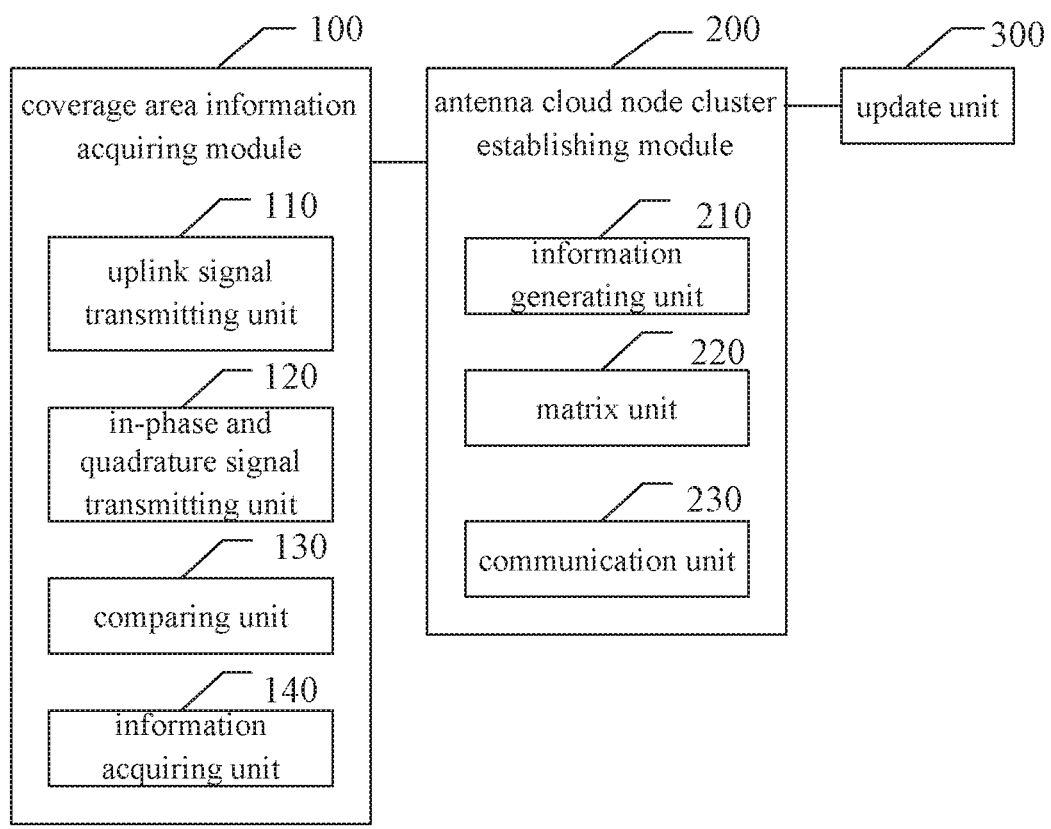
FIG. 5 is a structural block diagram of a system for implementing an antenna cloud node communication in an indoor high-density network according to another embodiment of the present invention.

In the system for implementing an antenna cloud node communication in an indoor high-density network in FIG. 5, the coverage area information acquiring module 100 further includes the following elements.

An uplink signal transmitting unit 110 is configured to transmit an uplink signal for the user equipment.

An in-phase and quadrature signal transmitting unit 120 is configured to detect the uplink signal in real-time, wherein when the mRRHs identify the uplink signal of the user equipment, each mRRH correspondingly sends an in-phase and quadrature signal to the baseband processing unit.

A comparing unit 130 is configured to acquire, by the baseband processing unit, the in-phase and quadrature signal, of which the signal-to-interference noise ratio is greater than the signal-to-interference noise ratio threshold, based on each in-phase and quadrature signal of each mRRH.

An information acquiring unit 140 is configured to acquire the mRRH coverage area information according to the numbers of the mRRHs corresponding to the in-phase and quadrature signals which comprises the signal-to-interference noise ratio greater than or equal to the signal-to-interference noise ratio threshold.

Furthermore, in the system for implementing an antenna cloud node communication in an indoor high-density network, the information acquiring unit 140 is configured to select a mRRH having a maximum signal-to-interference noise ratio as a master node mRRH according to the mRRHs corresponding to in-phase and quadrature signals which include the signal-to-interference noise ratio greater than the signal-to-interference noise ratio threshold.

Additionally, in the system for implementing an antenna cloud node communication in an indoor high-density network, a update unit 300 is configured to enable the coverage area information acquiring module 100 when a movement of the user equipment is identified and the signal-to-interference noise ratio corresponding to the detected uplink signal of one mRRH in the antenna cloud node cluster is less than the signal-to-interference noise ratio threshold.

Furthermore, in the system for implementing an antenna cloud node communication in an indoor high-density network in FIG. 5, the antenna cloud node cluster establishing module 200 further includes an information generating unit 210, a matrix unit 220, and a communication unit 230.

The information generating unit 210 is configured to generate the mRRH coverage area information according to a position of the user equipment, where the mRRH coverage area information is composed of the mRRH number.

The matrix unit 220 is configured to establish an antenna cloud node cluster, represented by a matrix, by serving the mRRH number as a node.

The communication unit 230 is configured to make communication between the user equipments by using the antenna cloud node cluster.

Moreover, the matrix unit 220 is configured to serve the mRRH number as a node so that one node corresponding to the signal-to-interference noise ratio of the uplink signal which is received by the mRRH 1 to mRRH 9 and is greater than or equal to a signal-to-interference noise ratio threshold is quantized to 1, and another node corresponding to the signal-to-interference noise ratio of the uplink signal which is greater than a signal-to-interference noise ratio threshold is quantized to 0 for generating the matrix corresponding to the antenna cloud node cluster.

According to the above-mentioned descriptions, in the method for implementing an antenna cloud node communication in an indoor high-density network and system thereof, the method includes: when a plurality of mRRHs detect uplink signals of the user equipments and a signal-to-interference noise ratio of each uplink signal is greater than or equal to a signal-to-interference noise ratio threshold, a baseband unit obtains mRRH coverage area information corresponding to the position of the user equipment according to the numbers of the mRRHs, where the mRRH indicates a low power wireless broadband head-end apparatus. The mRRH coverage area information corresponding to the position of the user equipment is configured to establish an antenna cloud node cluster, represented by a matrix, and the user equipments make communication each other by using the antenna cloud node cluster. The antenna cloud node clusters are established in real-time based on a user equipment-centric feature to solve the problem of the boundary. The user equipment-centric feature ensures that the signal-to-interference noise ratio in the antenna cloud node cluster is unified, eliminates the high-frequency switching state and provides a continuous network throughput.

As is understood by persons skilled in the art, the foregoing preferred embodiments of the present disclosure are illustrative rather than limiting of the present disclosure. It is intended that they cover various modifications and similar arrangements be included in the spirit and scope of the present disclosure, the scope of which should be accorded the broadest interpretation so as to encompass all such modifications and similar structures.

What is claimed is:

1. A method for implementing an antenna cloud node communication in an indoor high-density network; comprising the steps of:
   transmitting, by a user equipment, an uplink signal to allow a plurality of micro power remote radio heads (mRRHs) to detect the uplink signal of the user equipment;
   acquiring, by a baseband processing unit, a mRRH coverage area information corresponding to a position of the user equipment according to a plurality of the numbers of the mRRHs when each mRRH identifies the uplink signal of the user equipment and a signal-to-interference noise ratio of each uplink signal is either greater than or equal to a signal-to-interference noise ratio threshold;
   establishing an antenna cloud node cluster, represented by a matrix; according to the mRRH coverage area information corresponding to the position of the user equipment, and making, by the user equipment, communication using the antenna cloud node cluster; and
   continuously detecting, by each mRRH, the uplink signal of the user equipment, when a movement of the user equipment is identified and the signal-to-interference noise ratio corresponding to the detected uplink signal of one mRRH in the antenna cloud node cluster is less than the signal-to-interference noise ratio threshold.

2. The method for implementing the antenna cloud node communication in the indoor high-density network of claim 1, wherein the step of acquiring, by the baseband processing unit, the mRRH coverage area information corresponding to the position of the user equipment according to the numbers of the mRRHs when each mRRH identifies the uplink signal of the user equipment and the signal-to-interference noise ratio of each uplink signal is either greater than or equal to the signal-to-interference noise ratio threshold further comprises:
   detecting, by the mRRHs, the uplink signal in real-time, wherein when the mRRHs identify the uplink signal of the user equipment, each mRRH correspondingly sends an in-phase and quadrature signal to the baseband processing unit;
   acquiring, by the baseband processing unit, the in-phase and quadrature signal of which the signal-to-interference noise ratio is greater than the signal-to-interference noise ratio threshold, based on each in-phase and quadrature signal of each mRRH; and
   acquiring the mRRH coverage area information according to the numbers of the mRRHs corresponding to the in-phase and quadrature signals which comprises the signal-to-interference noise ratio greater than or equal to the signal-to-interference noise ratio threshold.

3. The method for implementing the antenna cloud node communication in the indoor high-density network of claim 2, wherein during the step of acquiring the mRRH coverage area information according to the numbers of the mRRHs corresponding to the in-phase and quadrature signals which comprises the signal-to-interference noise ratio greater than or equal to the signal-to-interference noise ratio threshold, one mRRH having a maximum signal-to-interference noise ratio is defined as a master node, and the remaining mRRHs are defined as slave nodes.

4. The method for implementing the antenna cloud node communication in the indoor high-density network of claim 2, wherein the step of establishing an antenna cloud node cluster, represented by a matrix, according to the mRRH coverage area information corresponding to the position of the user equipment, and making, by the user equipment, communication using the antenna cloud node cluster further comprises:
   generating the mRRH coverage area information according to the position of the user equipment, wherein the mRRH coverage area information is composed of the numbers of the mRRHs;
   establishing the antenna cloud node cluster, represented by the matrix, by assigning the numbers of the mRRHs as nodes; and
   making, by the user equipment, communication using the antenna cloud node cluster.

5. The method for implementing the antenna cloud node communication in the indoor high-density network of claim 4, wherein the step of establishing the antenna cloud node cluster, represented by the matrix, by assigning the numbers of the mRRHs as nodes further comprises:
   assigning the numbers of the mRRHs as the nodes wherein a portion of nodes corresponding to the signal-to-interference noise ratio of the uplink signal which is greater than or equal to the signal-to-interference noise ratio threshold are quantized to 1, and another portion of nodes corresponding to the signal-to-interference noise ratio of the uplink signal which is less than to the signal-to-interference noise ratio threshold are quantized to 0, for generating the matrix of the antenna cloud node cluster.

6. The method for implementing the antenna cloud node communication in the indoor high-density network of claim 1, wherein the step of continuously detecting, by each mRRH, the uplink signal of the user equipment, when the movement of the user equipment is identified and the signal-to-interference noise ratio corresponding to the detected uplink signal of one mRRH in the antenna cloud node cluster is less than the signal-to-interference noise ratio threshold further comprises:
  detecting the movement of the user equipment;
  when the movement of the user equipment is identified, determining whether the signal-to-interference noise ratio corresponding to the uplink signal of the mRRH is less than the signal-to-interference noise ratio threshold in the antenna cloud node cluster or not; and
  continuously detecting, by each mRRH, the uplink signal of the user equipment for updating the matrix corresponding to the antenna cloud node cluster if the signal-to-interference noise ratio corresponding to the uplink signal of the mRRH is less than the signal-to-interference noise ratio threshold in the antenna cloud node cluster.

7. A method for implementing an antenna cloud node communication in an indoor high-density network, comprising the steps of:
  (A) acquiring, by a baseband processing unit, a mRRH coverage area information corresponding to a position of the user equipment according to a plurality of the numbers of the mRRHs when each mRRH identifies the uplink signal of the user equipment and a signal-to-interference noise ratio of each uplink signal is either greater than or equal to a signal-to-interference noise ratio threshold; and
  (B) establishing an antenna cloud node cluster, represented by a matrix, according to the mRRH coverage area information corresponding to the position of the user equipment, and making, by the user equipment, communication using the antenna cloud node cluster;
  (C) continuously detecting, by each mRRH, the uplink signal of the user equipment in the step (A), when a movement of the user equipment is identified and the signal-to-interference noise ratio corresponding to the detected uplink signal of one mRRH in the antenna cloud node cluster is less than the signal-to-interference noise ratio threshold.

8. The method for implementing the antenna cloud node communication in the indoor high-density network of claim 7, wherein the step (A) further comprises:
  (A1) transmitting, by a user equipment, an uplink signal;
  (A2) detecting, by the mRRHs, the uplink signal in real-time, wherein when the mRRHs identify the uplink signal of the user equipment, each mRRH correspondingly sends an in-phase and quadrature signal to the baseband processing unit;
  (A3) acquiring, by the baseband processing unit, the in-phase and quadrature signal of which the signal-to-interference noise ratio is greater than the signal-to-interference noise ratio threshold, based on each in-phase and quadrature signal of each mRRH; and
  (A4) acquiring the mRRH coverage area information according to the numbers of the mRRHs corresponding to the in-phase and quadrature signals which comprises the signal-to-interference noise ratio greater than or equal to the signal-to-interference noise ratio threshold.

9. The method for implementing the antenna cloud node communication in the indoor high-density network of claim 8, wherein during the step (A4) of acquiring the mRRH coverage area information according to the numbers of the mRRHs corresponding to the in-phase and quadrature signals which comprises the signal-to-interference noise ratio greater than or equal to the signal-to-interference noise ratio threshold, one mRRH having a maximum signal-to-interference noise ratio is defined as a master node, and the remaining mRRHs are defined as slave nodes.

10. The method for implementing the antenna cloud node communication in the indoor high-density network of claim 8, wherein the step (B) further comprises:
  (B1) generating the mRRH coverage area information according to the position of the user equipment, wherein the mRRH coverage area information is composed of the numbers of the mRRHs;
  (B2) establishing the antenna cloud node cluster, represented by the matrix, by assigning the numbers of the mRRHs as nodes; and
  (B3) making, by the user equipment, communication using the antenna cloud node cluster.

11. The method for implementing the antenna cloud node communication in the indoor high-density network of claim 10, wherein the step (B2) further comprises:
  assigning the numbers of the mRRHs as the nodes wherein a portion of nodes corresponding to the signal-to-interference noise ratio of the uplink signal which is greater than or equal to the signal-to-interference noise ratio threshold are quantized to 1, and another portion of nodes corresponding to the signal-to-interference noise ratio of the uplink signal which is less than to the signal-to-interference noise ratio threshold are quantized to 0, for generating the matrix of the antenna cloud node cluster.

12. The method for implementing the antenna cloud node communication in the indoor high-density network of claim 7, wherein the step (C) further comprises:
  (C1) detecting the movement of the user equipment;
  (C2) when the movement of the user equipment is identified; determining whether the signal-to-interference noise ratio corresponding to the uplink signal of the mRRH is less than the signal-to-interference noise ratio threshold in the antenna cloud node cluster or not; and
  (C3) continuously detecting, by each mRRH, the uplink signal of the user equipment in the step (A) for updating the matrix corresponding to the antenna cloud node cluster if the signal-to-interference noise ratio corresponding to the uplink signal of the mRRH is less than the signal-to-interference noise ratio threshold in the antenna cloud node cluster.

13. A system for implementing an antenna cloud node communication in an indoor high-density network wherein the system comprises a storage medium for storing program instructions thereon and a processor connected to the storage medium, wherein the processor is configured to execute steps comprising:
  acquiring, by a baseband processing unit, a mRRH coverage area information corresponding to a position of the user equipment according to a plurality of the numbers of the mRRHs when each mRRH identifies the uplink signal of the user equipment and a signal-to-interference noise ratio of each uplink signal is either greater than or equal to a signal-to-interference noise ratio threshold; and
  establishing an antenna cloud node cluster, represented by a matrix, according to the mRRH coverage area information corresponding to the position of the user equipment, and making, by the user equipment, communication using the antenna cloud node cluster.

14. The system for implementing the antenna cloud node communication in the indoor high-density network of claim 13, wherein the steps executed by the processor further comprises:

transmitting, by a user equipment, an uplink signal.

15. The system for implementing the antenna cloud node communication in the indoor high-density network of claim 14, wherein the steps executed by the processor further comprises:

detecting, by the mRRHs, the uplink signal in real-time, wherein when the mRRHs identify the uplink signal of the user equipment, each mRRH correspondingly sends an in-phase and quadrature signal to the baseband processing unit;

acquiring, by the baseband processing unit, the in-phase and quadrature signal of which the signal-to-interference noise ratio is greater than the signal-to-interference noise ratio threshold, based on each in-phase and quadrature signal of each mRRH; and acquiring the mRRH coverage area information according to the numbers of the mRRHs corresponding to the in-phase and quadrature signals which comprises the signal-to-interference noise ratio greater than or equal to the signal-to-interference noise ratio threshold.

16. The system for implementing the antenna cloud node communication in the indoor high-density network of claim 15, wherein when the mRRH coverage area information is acquired according to the numbers of the mRRHs corresponding to the in-phase and quadrature signals which comprises the signal-to-interference noise ratio greater than or equal to the signal-to-interference noise ratio threshold, one mRRH having a maximum signal-to-interference noise ratio is defined as a master node, and the remaining mRRHs are defined as slave nodes.

17. The system for implementing the antenna cloud node communication in the indoor high-density network of claim 16, the steps executed by processor further comprises:

enabling acquiring of the mRRH coverage area information when a movement of the user equipment is identified and the signal-to-interference noise ratio corresponding to the detected uplink signal of one mRRH in the antenna cloud node cluster is less than the signal-to-interference noise ratio threshold.

18. The system for implementing the antenna cloud node communication in the indoor high-density network of claim 15, wherein the steps executed by the processor further comprises:

generating the mRRH coverage area information according to the position of the user equipment, wherein the mRRH coverage area information is composed of the numbers of the mRRHs;

establishing the antenna cloud node cluster, represented by the matrix, by assigning the numbers of the mRRHs as nodes; and establishing communication using the antenna cloud node cluster.

19. The system for implementing the antenna cloud node communication in the indoor high-density network of claim 18, wherein the steps executed by the processor further comprises:

assigning the numbers of the mRRHs as the nodes wherein a portion of nodes corresponding to the signal-to-interference noise ratio of the uplink signal which is greater than or equal to the signal-to-interference noise ratio threshold are quantized to 1, and another portion of nodes corresponding to the signal-to-interference noise ratio of the uplink signal which is less than to the signal-to-interference noise ratio threshold are quantized to 0, for generating the matrix of the antenna cloud node cluster.

* * * * *